(12) United States Patent
Arnouse

(10) Patent No.: US 7,500,107 B2
(45) Date of Patent: Mar. 3, 2009

(54) LOG-IN SECURITY DEVICE

(76) Inventor: Michael Arnouse, 15 Hickory Dr., Old Brookville, NY (US) 11545

( * ) Notice: Subject to any disclaimer, the term of this patent is extended or adjusted under 35 U.S.C. 154(b) by 255 days.

(21) Appl. No.: 11/054,519

(22) Filed: Feb. 9, 2005

(65) Prior Publication Data

US 2005/0177735 A1    Aug. 11, 2005

Related U.S. Application Data

(60) Provisional application No. 60/543,016, filed on Feb. 9, 2004.

(51) Int. Cl.
*H04L 9/32* (2006.01)
(52) U.S. Cl. ............... 713/186; 726/16; 726/21; 726/28
(58) Field of Classification Search ........ 713/186; 726/9, 17, 30, 21
See application file for complete search history.

(56) References Cited

U.S. PATENT DOCUMENTS

| | | |
|---|---|---|
| 3,655,947 A | 4/1972 | Yaramoto et al. |
| 3,778,595 A | 12/1973 | Hatanka et al. |
| 4,164,320 A | 8/1979 | Irazoqui et al. |
| 4,735,578 A | 4/1988 | Reichardt et al. |
| 4,752,234 A | 6/1988 | Reichardt et al. |
| 4,839,857 A | 6/1989 | Mersiovsky et al. |
| 4,909,742 A | 3/1990 | Ohkubo et al. |
| 4,959,788 A | 9/1990 | Nagata et al. |
| 4,976,630 A | 12/1990 | Schuder et al. |
| 5,176,523 A | 1/1993 | Lai |
| 5,224,873 A | 7/1993 | Duffet et al. |
| 5,225,653 A | 7/1993 | Martin et al. |
| 5,229,764 A | 7/1993 | Matchett et al. |
| 5,252,815 A | 10/1993 | Pernet |
| 5,395,259 A | 3/1995 | Casses |
| 5,548,566 A | 8/1996 | Barker |
| 5,652,570 A | 7/1997 | Lepkofker |
| 5,719,950 A * | 2/1998 | Osten et al. ............ 382/115 |
| 5,751,246 A | 5/1998 | Hertel |
| 5,832,488 A | 11/1998 | Eberhardt |
| 5,859,416 A | 1/1999 | Gatto |
| 5,987,136 A | 11/1999 | Schipper et al. |

(Continued)

FOREIGN PATENT DOCUMENTS

CA    2220035    5/1995

(Continued)

OTHER PUBLICATIONS

"Motorola Automotive Announces Revolutionary Single Chip GPS Device," Motorola Press Release; Farmington Hills, Michigan; Sep. 23, 2002.

(Continued)

*Primary Examiner*—Andrew L Nalven
(74) *Attorney, Agent, or Firm*—DLA Piper US LLP

(57) ABSTRACT

A security system comprises a log-in device including at least one biometric device for receiving current biometric data from a user. The log-in device compares the current biometric data of the user with pre-stored biometric data for all authorized users. At least one regulated device is in communication with the log-in device, wherein the log-in device regulates access to the at least one regulated device.

37 Claims, 1 Drawing Sheet

U.S. PATENT DOCUMENTS

| | | | |
|---|---|---|---|
| 5,995,936 A | 11/1999 | Brais et al. | |
| 6,027,216 A | 2/2000 | Guyton et al. | |
| 6,078,848 A | 6/2000 | Bernstein et al. | |
| 6,104,809 A | 8/2000 | Berson et al. | |
| 6,131,090 A | 10/2000 | Basso, Jr. et al. | |
| 6,140,936 A | 10/2000 | Armstrong | |
| 6,144,848 A | 11/2000 | Walsh et al. | |
| 6,205,437 B1 | 3/2001 | Gifford | |
| 6,219,439 B1 | 4/2001 | Burger | |
| 6,224,109 B1 | 5/2001 | Yang | |
| 6,259,769 B1 | 7/2001 | Page et al. | |
| 6,282,154 B1 | 8/2001 | Webb | |
| 6,304,848 B1 | 10/2001 | Singer | |
| 6,324,261 B1 | 11/2001 | Merte | |
| 6,327,376 B1 * | 12/2001 | Harkin | 382/124 |
| 6,333,988 B1 | 12/2001 | Seal et al. | |
| 6,386,451 B1 | 5/2002 | Sehr | |
| 6,421,650 B1 | 7/2002 | Goetz et al. | |
| 6,445,300 B1 | 9/2002 | Luman | |
| 6,450,407 B1 | 9/2002 | Freeman et al. | |
| 6,463,039 B1 | 10/2002 | Ricci et al. | |
| 6,493,672 B2 | 12/2002 | D'Agosto, III et al. | |
| 6,510,380 B1 | 1/2003 | Curatolo et al. | |
| 6,522,552 B1 | 2/2003 | Lee | |
| 6,546,112 B1 | 4/2003 | Rhoads | |
| 6,557,752 B1 | 5/2003 | Yacoob | |
| 6,655,590 B1 | 12/2003 | McFeely et al. | |
| 6,850,147 B2 * | 2/2005 | Prokoski et al. | 340/5.53 |
| 6,871,242 B1 * | 3/2005 | Ho-Lung et al. | 710/16 |
| 7,035,626 B1 * | 4/2006 | Luciano, Jr. | 455/414.1 |
| 7,117,370 B2 * | 10/2006 | Khan et al. | 713/186 |
| 7,123,141 B2 * | 10/2006 | Contestabile | 340/539.13 |
| 7,171,680 B2 * | 1/2007 | Lange | 726/5 |
| 2001/0018639 A1 | 8/2001 | Bunn | |
| 2002/0035484 A1 | 3/2002 | McCormick | |
| 2002/0084915 A1 | 7/2002 | Budnovitch | |
| 2002/0095587 A1 | 7/2002 | Doyle et al. | |
| 2002/0100803 A1 | 8/2002 | Sehr | |
| 2002/0118112 A1 | 8/2002 | Lang | |
| 2003/0017871 A1 | 1/2003 | Urie et al. | |
| 2003/0052159 A1 | 3/2003 | Kawan | |
| 2003/0072475 A1 | 4/2003 | Tamori | |
| 2003/0191949 A1 | 10/2003 | Odagawa | |
| 2004/0192438 A1 * | 9/2004 | Wells et al. | 463/29 |

FOREIGN PATENT DOCUMENTS

| | | |
|---|---|---|
| EP | 1004980 A2 | 5/2000 |
| EP | 1073025 A2 | 1/2001 |
| JP | 7319983 A2 | 12/1995 |
| WO | WO 97/22092 | 6/1997 |
| WO | WO 99/27474 | 6/1999 |
| WO | WO 03/015299 A1 | 2/2003 |

OTHER PUBLICATIONS

"Instant GPS" Motorola Brochure; Farmington Hills, Michigan; 2002.

* cited by examiner

LOG-IN SECURITY DEVICE

CROSS REFERENCE TO RELATED APPLICATIONS

The present application is related to U.S. Provisional Application Ser. No. 60/543,016 filed Feb. 9, 2004, the entire disclosure of which is incorporated by reference herein.

FIELD OF THE INVENTION

The present invention relates generally to security devices, and in particular to network security devices.

BACKGROUND

For a variety of considerations, it is often desirable to have a security mechanism to regulate access to a device to certain authorized individuals. Further, it may be desirable to obtain accurate identity and location information of persons seeking to access a particular device. That identity and location information can then be utilized later to track identity and location of individuals transmitting messages over a network.

Signatures have been utilized for centuries as the primary method of authentication. For many years, the process has involved a visual inspection between a newly signed document and a prior signature. This process, however, has significant limitations, as it typically depends on subjective decisions made by individuals having little skill, if any, in making signature comparisons. In recent years, computers have been increasingly utilized to assist in the authentication process, however, there are still significant drawbacks. Much of the problems have been a result of the increased globalization of business and society. For example, differences in language, culture and geographic location have added many new variables that have needed to be considered and dealt with appropriately.

Another complicating factor is that we live, it is said, in the 'information age'. What is meant by that phrase is that we live in a time when information is very important and easily accessible. To get a real appreciation, however, as to the impact the information age has had on society, it is necessary to reflect on the meaning of term "information" itself. "Information" is a term that has broad implications in today's environment and covers any type of "data" or "facts" and in any format, such as, for example, text, graphics, audio or video, to name a few.

Technological innovation has made it progressively easier in recent years to disseminate information from place to place, for example, by telephone, portable devices, such as recorders or PDA's, and via computer networks, such as the internet. The ease by which information can be readily obtained and disseminated have raised many concerns, such as privacy issues as well as issues of fraud and security concerns. Laws have been enacted in attempt to deter piracy of sensitive public or private information, but that has done little to address the source of the problem.

Moreover, as technology advances and links goods and services throughout the world, the economy and stability of civilized societies become more vulnerable to sophisticated means of attack and destabilization. Government and businesses are linked world wide via telephone, cable, and wireless technologies. This technological communications revolution has left our society open to a new worldwide threat. Interference with our current technologies by a third party wishing to cause chaos in the free world is a constant and real threat to all people.

The computer linked worldwide communications systems are vulnerable based on the current system. The present system allows acceptance of devastating electronic programs such as so called "worms" and "viruses". The present system also allows the very worrisome intrusion by "hackers", who can gain control of vital government functions and an individual's personal records.

Apart from prevention of attacks upon the information that is linked to government and private institutions, a method to track and help apprehend the criminals and terrorists that wish to harm the free world is also needed. Presently, there is no system in place to link the actual person responsible for the attack to the crime.

In view of the forgoing, there is seen a need for improving the manner by which information integrity can be maintained and dissemination regulated.

SUMMARY

The various embodiments of the invention disclose a log-in security device. In accordance with one embodiment, a security device comprises a log-in device comprising at least one biometric device for receiving current biometric data from a user. The log-in device compares the current biometric data of the user with pre-stored biometric data for all authorized users. At least one regulated device is in communication with the log-in device, wherein the log-in device regulates access to the at least one regulated device.

BRIEF DESCRIPTION OF THE DRAWING

The present invention can be best understood in connection with the accompanying drawing, in which.

DETAILED DESCRIPTION OF VARIOUS EMBODIMENTS

Figure 1:
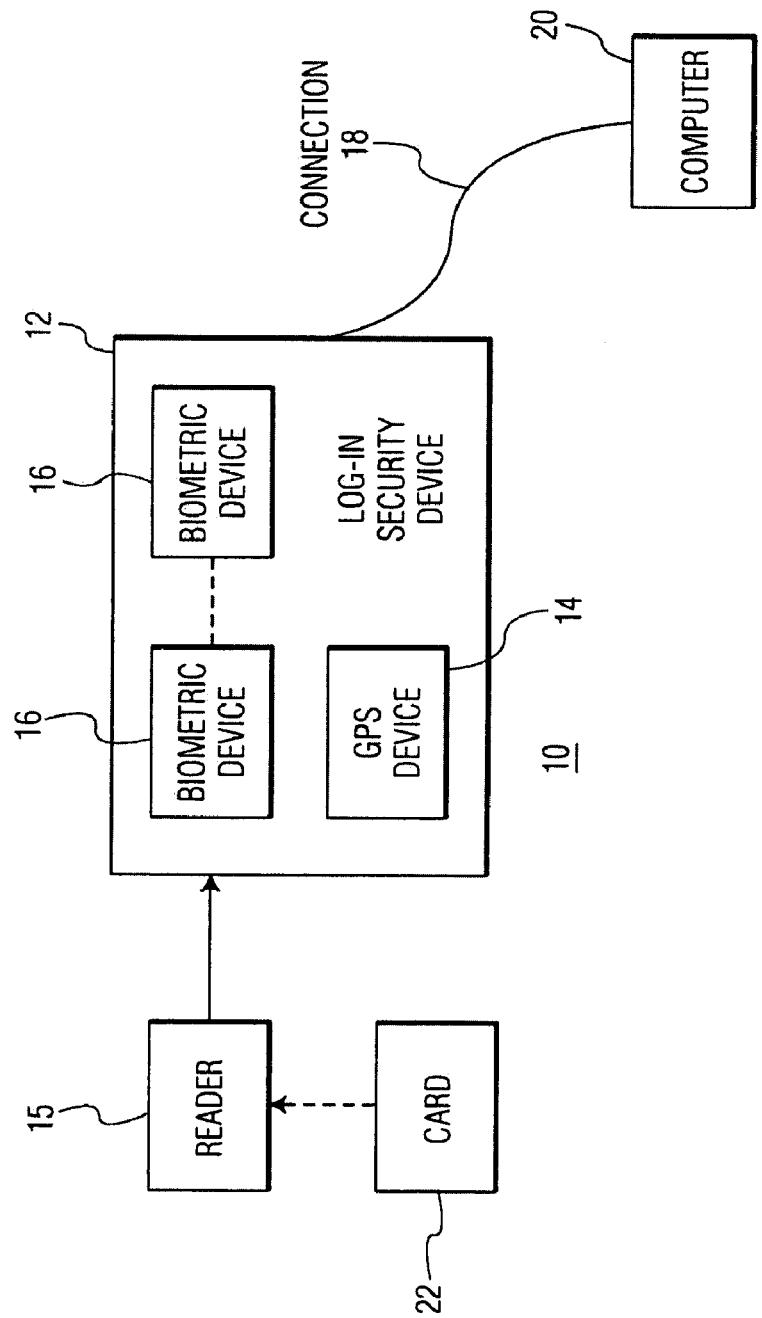
FIG. 1 is a block diagram illustrating an exemplary embodiment of a log-in security device incorporated within an exemplary system.

The following embodiments of the invention may be implemented using hardware or software or any combination of the two where desired. Various embodiments may also be implemented using commercially available technology.

An exemplary embodiment of the invention comprises a log-in security device 12. FIG. 1 illustrates a log-in security system 10 including a log-in security device 12, a GPS device 14, at least one biometric device 16 and a connection 18 by which the log-in device 12 operates to regulate access to a regulated device 20. In one embodiment, the regulated device 20 comprises a computer. However, it should be noted that device 20 may also comprise one or more devices such as, without limitation, a processor, a microprocessor, a personal computer, such as a laptop, palm PC, desktop or workstation; a network server; a mainframe; an electronic wired or wireless device such as, for example, a telephone; an interactive television or electronic transceiver box attached to a television, such as, for example, a television adapted to be connected to the Internet; a cellular telephone; a personal digital system; electronic pager and digital watch. Application software may run on the device 20 for any number of given services, such as commercial transactions, medical records, travel documents, entertainment transactions, government administrative documents, government intelligence documents and the like.

Device 20 as shown may represent a stand-alone device or a network of devices. The term "network" as used herein should be broadly construed to comprise any wired or wireless network, or any combination wired/wireless network, such as, for example, a telephone or cellular telephone network, an internal business network, cable/DSL/T1 networks, satellite networks, the Internet or world wide web, an intranet, or an extranet, etc.

As mentioned above, the log-in device 12 is connected to device 20 via connection 18. For example, connection 18 may be a wired communications medium such as, for example, a standard serial, universal serial bus (USB), or IEEE-1394 "firewire" port connection. In another example, connection 18 may represent a wireless communication medium such as, for example, a wireless transmitter/receiver arrangement such as a cellular telephone network or a Wi-Fi network. Alternatively, the log-in device 12 may be incorporated directly within the device 20. Further, in embodiments where device 20 comprises a network of devices, such devices may be in communication with each other via a combination of wired and wireless communications media.

As is illustrated in FIG. 1, in one embodiment, the at least one biometric device 16 further includes a pulse reader. As described in more detail below, the pulse reader may detect at least one of a presence of a pulse, lack of a pulse or an irregular pulse of a user. In operation, if the presence of a pulse is detected and no irregularities noted, the log-in device 12 may authorize the user to access the device 20. However, if no pulse is detected and/or an irregular pulse is detected, the log-in device 12 may deny access to the device 20. In this manner, the pulse reader would be able to detect attempts by unauthorized persons to gain access to the regulated device 20, such as where an unauthorized person may force an authorized user against their will to access the regulated device 20, resulting in an irregular pulse detection due to the distressed state of the authorized user, or where an unauthorized person may utilize the biometric characteristics of a deceased user, such as a fingerprint from a severed hand, or iris, etc. from an authorized deceased user, resulting in no pulse being detected.

In this and other embodiments, the pulse reader can also be utilized as a biometric device. For example, if the presence of a pulse is detected and the detected pulse is regular within predetermined parameters compared to a pre-stored "regular" pulse for the user, the log-in device 12 may authorize the user to access the device 20. In this manner, the pulse data read by the pulse reader 16 is compared against existing data for all authorized users to verify the identity of a user attempting to access device 20. The existing pulse data for all authorized users may be provided at any desired location, such as, for example, pre-stored in log-in device 12, pre-stored in device 20 or pre-stored in some other external database accessible over a network. The pre-stored pulse data may also be stored on a smart card 22, as illustrated in FIG. 1.

In this and other embodiments, the log-in device 12 may further include a smart card reader 15 adapted for reading the smart card 22. The smart card 22 includes pre-stored biometric and/or other data that is unique to a user that may be read by the smart card reader 15. The term "smart card reader" as used herein should be broadly construed to comprise any suitable type of processing device capable for communicating with the smart card 22 and log-in device 12 in accordance with embodiments of the invention.

An exemplary embodiment of a smart card 22 may be used as a digital identification device. The digital identification device may comprise a card or like type of device that may be utilized as a secure personal information medium. In this embodiment, non-removable, non-volatile solid state memory, such as flash memory, may be used to store encrypted digital data in the record unit, although other storage mechanisms may also be utilized where desired. The memory may be partitioned and adapted to store specific data types in specific locations in the memory. In this way, memory blocks may be assigned to information areas such as, for example, personal name, biometric data, encoded digital individual identifying photograph, medical history data, driver's data, etc. The card may also have a connector, such as along its bottom surface, which interfaces with the card reader 15, such as a playback/send reader unit, when the card 22 is inserted into a recessed port, such as in the reader's top surface. The playback/send unit may also have a unique pin code, which allows access to the specific data encoded on the digital identification memory card. In this manner, only specific users can gain access to specific data, making the card unalterable by others. For example, it can be regulated so that the individual who is issued the card, i.e., the owner of the card, can not access the data to tamper with or change any information, police can access the Picture ID and driver's data but not the medical or other personal data, likewise a doctor can access the medical history but not bank records, etc.

As shown, the smart card reader 15 and log-in device 12 may be separate components or, alternatively, they may be combined together in a single device where desired. In other embodiments, additional processing devices may be utilized, such as fax machines, etc., or none at all where the smart card 22 may be received directly by the log-in device 12. In one embodiment, the smart card 22 and an associated security measure, for example, pre-stored biometric information stored on the smart card 22, may be utilized along with additional information to verify the identity of a user. The smart card 22 may be used in combination with one or more current biometric characteristics taken from the user by the pulse reader 16 for the purpose of user identification. In addition or alternatively, other biometric devices 16 may be utilized in addition to the pulse reader, or in lieu of the pulse reader, to obtain current biometric data from a user. Examples of such biometric devices 16 include, but are not limited to, at least one of a fingerprint, retina, vein, or hand geometry device.

Thus, in operation the smart card reader 15 sends the pre-stored biometric data read from a user's smart card 22 to the log-in device 12. In one embodiment, the data from the fingerprint/pulse reader 16 and the smart card reader 15 will be combined to create a message combining together the pre-stored and current biometric data for a user in digital format, which is transferred to device 20, and then subsequently transmitted from device 20 for any network communication, such as to one or more external locations (not shown). The sender of the communication will then be verified by a match between the pre-stored and current biometric data.

Once identity is verified, then access is allowed to device 20. In addition, if access is denied, such as when the biometric information of the user does not match any of the pre-stored biometric data for all authorized users and/or the pulse reader 16 does not detect one of the presence of a pulse or a regular pulse, an optional unauthorized message may be sent to any desired location, such as to an external location via the network from device 20 to alert that a person may be attempting to hack into the system. In another embodiment, location information may be provided via the log-in device 12, such as a particular Internet protocol ("IP") address.

In another embodiment, the log-in device 12 comprises a fingerprint/pulse reader 16 and a global positioning system (GPS) device 14. As noted above, while in the present embodiment a pulse reader 16 is described, any other suitable biometric device may be utilized in addition to or as well as a pulse reader, such as, for example, a retina reader, vein reader, hand geometry reader, etc.

The GPS device 14 verifies the location of the individual accessing device 20. In one embodiment, the GPS device 14 may comprise a digital identification memory card 22 with wireless connectivity. For example, the digital identification memory card 22 may be enhanced with microprocessor, RF receive, RF transmit and a power source, such as a battery. This capability allows for connectivity to wireless LAN as well as the Internet via wireless Internet connection. Reception and decoding of a GPS signal enables the card to locate itself. In this way the location of the card can be broadcast, received and shown on a map using a standard Internet browser. Also short messaging service (SMS) or enhanced messaging service (EMS) or other text messages can be sent to a wireless mobile handset upon request of an authorized user. In this embodiment, the playback/send unit may also operate as a battery charger.

In another embodiment, a location device can be provided on the smart card 22 and may communicate by wireless means with the smart card reader 15 in the form of a scanner, when the card 22 is brought into proximity with the scanner. For example, the GPS device 14 can be adapted to transmit designated information, such as an ID, to the scanner either automatically or upon request of the scanner. The GPS device 14 may be powered by either a source external to the card 22, such as by the scanner, when the card 22 is brought into proximity with the scanner, or by a power source located on the card 22 itself. In this embodiment, the GPS device 14 may be adapted to communicate with the scanner from various distances, such as directly next to one another, i.e., 0-1 foot or from larger distances, such as the size of a room or building or a complex, etc. The scanner may further process the information received from the card in any desired manner. For example, the scanner may be utilized as a counter, such as to count the number of passerby's, such as for use at stores, conventions, trade shows, etc. In addition, the scanner may compare the ID against designated information, for example, an allow/deny list, most wanted list, etc. The designated information may be stored local at the scanner or provided from an external storage source, such as via a network connection. The scanners may be located at various pre-selected locations, such as at border check points or other secured areas, and in radar or other law enforcement equipment, etc.

In operation, the GPS device 14 sends the location data of a user attempting to access the device 20 to the log-in device 12. In one embodiment, the pulse reader 16 and GPS device 14 will create a message combining together the location and pulse data in digital format, which is transferred to device 20, and then subsequently transmitted from device 20 for any network communication, such as to one or more external locations. The external locations may include, for example, one or more databases or an external device that is similar to device 20. The sender of the communication will then be verified by the pulse data and location identifier. In addition, if access is denied, such as when the biometric information of the user does not match any of the pre-stored biometric data for all authorized users, the user is in an unauthorized location and/or the pulse reader 16 does not detect one of the presence of a pulse or a regular pulse, an optional unauthorized message may be sent to any desired location, such as to an external location via the network from device 20 to alert that a person may be attempting to hack into the system.

In other embodiments, the GPS data may be substituted or provided along with other data, such as the pre-stored biometric data from the smart card 22 and/or the Internet protocol (IP) address of the log-in device 12 of a user attempting to access the device 20.

The embodiments illustrated herein can be utilized as a security mechanism with any device where it may be desired to regulate access to certain authorized individuals. In this and other embodiments, it is also possible to obtain accurate identity and location information of persons seeking to access particular devices. That identity and location information can then be utilized later to track identity and location of individuals transmitting messages over a network.

Although the invention has been described in terms of exemplary embodiments, it is not limited thereto. Rather, the appended claims should be construed broadly to include other variants and embodiments of the invention which may be made by those skilled in the art without departing from the scope and range of equivalents of the invention.

The invention claimed is:

1. A security device comprising:
    a database storing biometric data and a baseline pulse reading of all authorized users of at least one regulated device;
    a log-in device in communication with the at least one regulated device and the database;
    the log-in device comprising:
        at least one biometric device adapted to receive current biometric data from a user and compare the current biometric data of the user with stored biometric data for all authorized users, and
        at least one pulse reader adapted to detect whether or not a pulse is present, and where a pulse is present, the log-in device adapted to compare the current pulse against the baseline pulse reading of all authorized users, and
        wherein the log-in device is adapted to grant or deny access to the regulated device based on the results of the comparison of current biometric data and stored biometric data, and the results of the comparison of the current pulse and the stored baseline pulse.

2. The security device of claim 1, wherein the log-in device identifies the occurrence of at least one of:
    biometric information of the user does not match any of the stored biometric data for all authorized users; and
    the pulse reader does not detect one of the presence of a pulse or the pulse reader detects that the current pulse does not substantially match a baseline pulse of any authorized user.

3. The security device of claim 2, wherein the log-in device denies access to the at least one regulated device upon the occurrence of:
    current biometric information does not match any of the stored biometric data for all authorized users; or
    the pulse reader does not detect the presence of a pulse or the current pulse does not substantially match a baseline pulse.

4. The security device of claim 1, wherein the log-in device communicates the current biometric data to the at least one regulated device.

5. The security device of claim 1, wherein the at least one regulated device is in communication with a network.

6. The security device of claim 5, wherein the at least one regulated device communicates the current biometric data to the network.

7. The security device of claim 1, wherein the at least one regulated device is in communication with the log-in device via a wired connection.

8. The security device of claim 1, wherein the at least one regulated device is in communication with the log-in device via a wireless connection.

9. The security device of claim 1, wherein the at least one regulated device includes at least one of a computer or handheld device.

10. The security device of claim 1, wherein the at least one biometric device is selected from a group consisting of a fingerprint, retina, vein or hand geometry device.

11. The security device of claim 1, wherein the database is external to the log-in device and the regulated device.

12. The security device of claim 1, wherein the log-in device is located within the at least one regulated device.

13. The security device of claim 1, further comprising a smart card reader for receiving a smart card having pre-stored biometric data for a user, wherein the log-in device is in communication with the smart card reader.

14. The security device of claim 13, wherein the log-in device generates a message including the identity of a user attempting to access the at least one regulated device.

15. The security device of claim 14, wherein the message further includes the IP address of the log-in device from which the user attempting to access the at least one regulated device.

16. The security device of claim 15, wherein the message is received by the at least one regulated device.

17. The security device of claim 16, wherein the message is received by an external device.

18. The security device of claim 13, wherein the smart card reader and the log-in device are located within the regulated device.

19. The security device of claim 1 wherein baseline pulse information is provided the by all authorized users during registration.

20. The security device of claim 1 wherein the log-in device denies access to the regulated device if the current pulse rate does not match the specific, stored baseline pulse rate of the specific user attempting to access the device.

21. A security system adapted for controlling access to a regulated device, the system comprising:
    a database storing authorized locations for all authorized users of the regulated device and a baseline pulse reading of all authorized users of the regulated device;
    a GPS device adapted to determine the location of a user when the user attempts to log-in to the regulated device and after logging in, while the user uses the regulated device; and
    a log-in device in communication with the GPS device and the database, the log-in device comprising at least one pulse reader, wherein the log-in device is adapted to compare the location of the user with authorized locations for all authorized users and compare the log-in pulse rate with the baseline pulse reading of all authorized users,
    wherein the log-in device generates a message including the current location and the identity of a user attempting to access at least one regulated device in communication with the log-in device, and
    wherein access to the regulated device is granted or denied based on the location of the user and the results of the comparison of the log-in pulse rate against the baseline pulse rates.

22. The security system of claim 21, wherein the database further comprises biometric information for all authorized users and the log-in device further comprises at least one biometric device for receiving current biometric data from a user, the log-in device adapted to compare the current biometric data of the user with the stored biometric data and wherein access to the regulated device is denied if the pulse reader does not detect a pulse, or the pulse does not substantially match a baseline pulse, or if the current biometric data does not substantially match the stored biometric information for any authorized individual, or if the individual is located in an unauthorized location.

23. The security system of claim 22, wherein the log-in device is in communication with and controls access to at least one regulated device.

24. The security system of claim 21, wherein the at least one biometric device includes at least one of a fingerprint, retina, vein or hand geometry device.

25. The security system of claim 21, wherein the message further includes the IP address of the log-in device from which the user is attempting to access the at least one regulated device.

26. The security system of claim 25, wherein the message is received by the at least one regulated device.

27. The security system of claim 25, wherein the message is received by an external device.

28. The security system of claim 21, wherein the GPS device and the log-in device are located within at least one regulated device.

29. The security device of claim 21, further comprising a smart card reader for receiving a smart card having pre-stored biometric data for a user, wherein the log-in device is in communication with the smart card reader.

30. The security device of claim 29, wherein the smart card reader, GPS device and log-in device are located within at least one regulated device.

31. The security system of claim 21 wherein the GPS device comprises a digital identification memory card with wireless connectivity.

32. A method of regulating access to a device comprising the steps of:
    receiving current biometric data from a user,
    receiving pulse data from a user
    detecting the presence of a pulse or lack of a pulse and if a pulse is present, comparing the current pulse against stored baseline pulse information of all authorized users of the device;
    comparing the current biometric data from the user with pre-stored biometric data for all authorized users of the device; and
    regulating access to at least one regulated device based at least in part on the comparisons by denying an authorized person or an unauthorized person access to the regulated device if the pulse reader does not detect a pulse, or if the pulse detected does not substantially match the stored baseline pulse information.

33. The method of claim 32, further comprising identifying the occurrence of at least one of:
    biometric information of the user does not match any of the stored biometric data for all authorized users; and
    not detecting the presence of a pulse or detecting that the pulse does not substantially match stored pulse information of an authorized user.

34. The method of claim 33, further comprising denying access to the at least one regulated device.

35. The method of claim 32, further comprising communicating the current biometric data to the regulated device.

36. The method of claim 32, further comprising communicating the current biometric data to a network.

37. The method of claim 32, further comprising denying a user access to the device if the current pulse does not match the stored baseline pulse of the specific user attempting to access the device.

* * * * *